United States Patent [19]

Raab et al.

[11] 4,383,147
[45] May 10, 1983

[54] ELECTRICAL SWITCH HAVING INTERLOCKED BLOWER AND AIR CONDITIONER SWITCH COMPONENTS FOR VEHICLES

[75] Inventors: Andrew F. Raab, Morton Grove, Ill.; Arthur G. Perkins, deceased, late of Grosse Ile, Mich., by Ruth Perkins, executrix

[73] Assignee: Indak Manufacturing Corp., Northbrook, Ill.

[21] Appl. No.: 339,301

[22] Filed: Jan. 15, 1982

[51] Int. Cl.³ ............................................. H01H 9/26
[52] U.S. Cl. ................................. 200/50 C; 200/5 E; 200/16 C; 200/153 J; 200/310
[58] Field of Search .................... 200/5 R, 5 E, 5 EA, 200/5 EB, 16 C, 16 D, 61.86, 153 J, 50 C

[56] References Cited

U.S. PATENT DOCUMENTS 3,187,602 6/1965 Cousins ........................... 200/5 E X
3,271,536 9/1966 Schink ............................... 200/16 C Primary Examiner—A. T. Grimley
Assistant Examiner—Morris Ginsburg
Attorney, Agent, or Firm—Burmeister, York, Palmatier, Hamby & Jones

[57] ABSTRACT

A combination blower and air conditioner switch for vehicles, comprising a blower speed control switch component including a blower control member movable from an OFF position to a series of ON positions to provide different blower speeds, an air conditioner switch component including a push button control member movable between OFF and ON positions against the biasing action of a return spring, latching means including a latching element for latching the push button control member in its ON position, and an interlock member movable by the blower control member to a disabling position for disabling the latching means when said blower control member is in its OFF position, such interlock member being movable to an enabling position for enabling such latching means when the blower control member is moved away from its OFF position to any of its ON positions, whereby the push button air conditioner control member cannot be latched in its ON position when the blower control member is in its OFF position. The latching means may be of the alternate latching type for alternately latching and unlatching the push button air conditioner control member in response to successive pushes thereof. The latch disabling action of the interlock member prevents the build-up of frost on the cooling coil of the air conditioner by preventing operation of the air conditioner unless the blower is energized to circulate air through the cooling coil.

21 Claims, 47 Drawing Figures

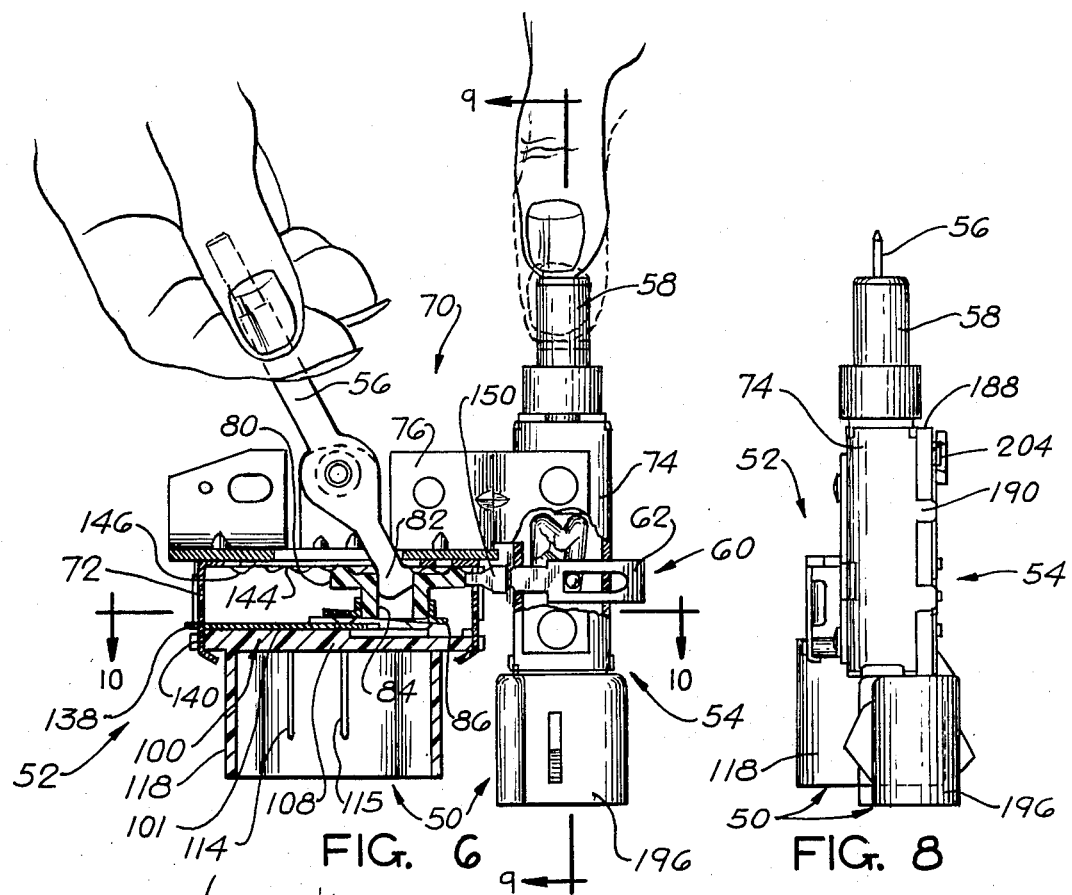
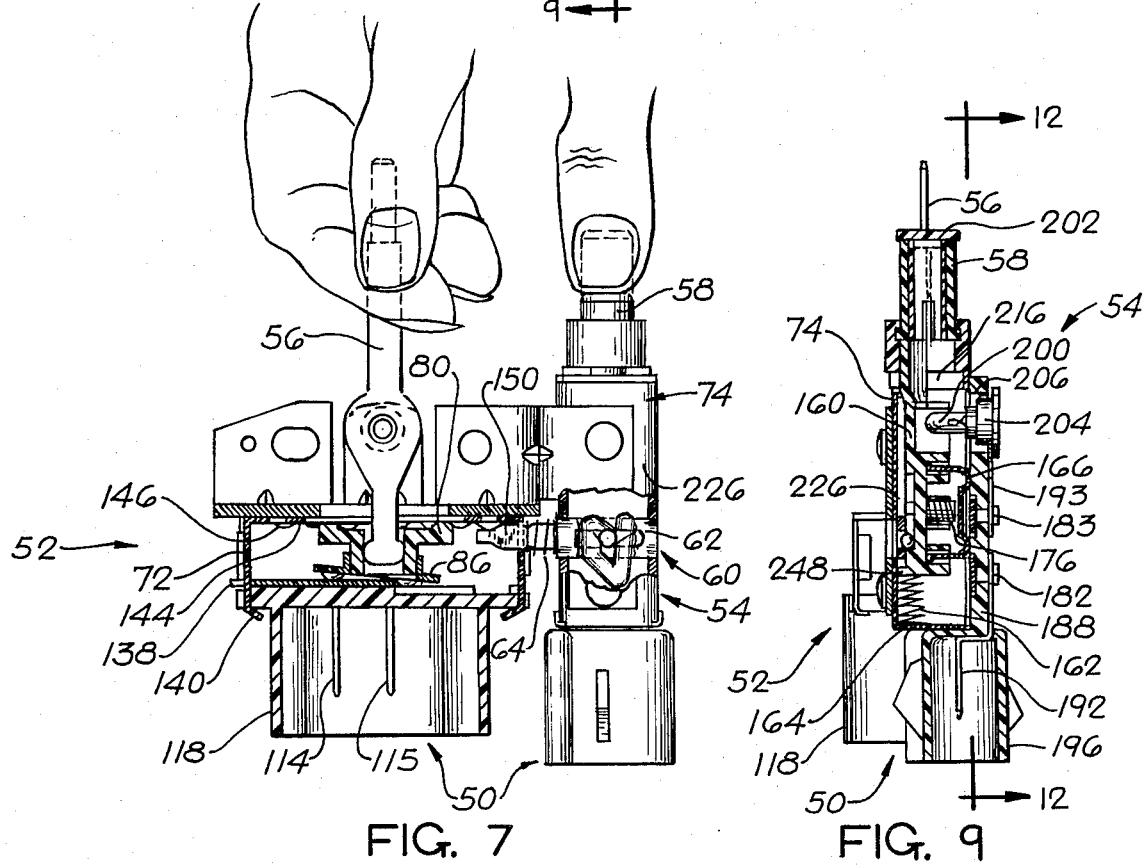

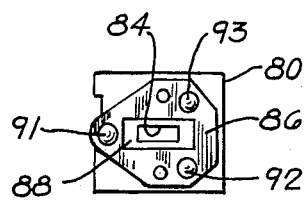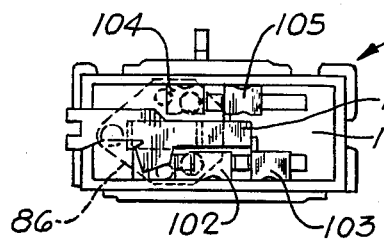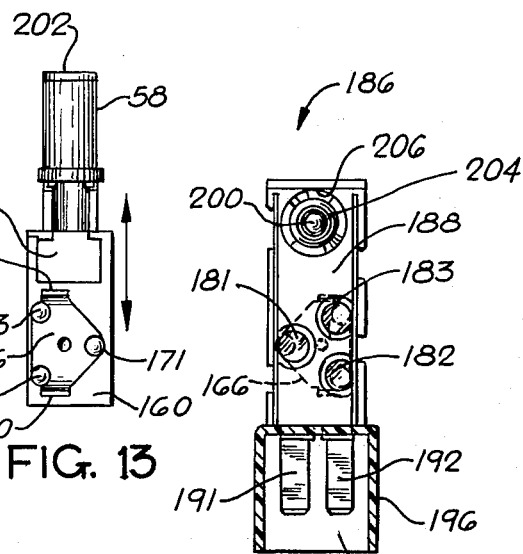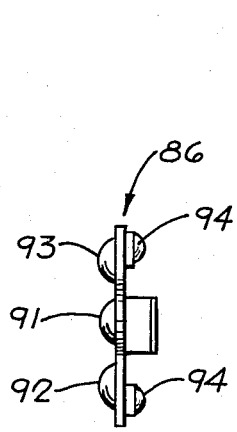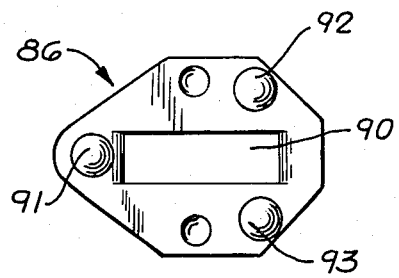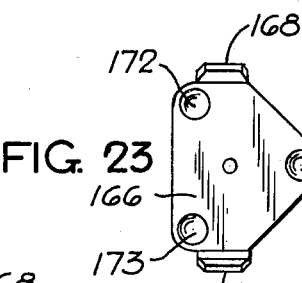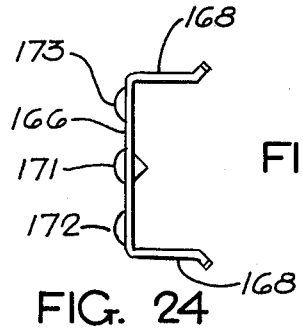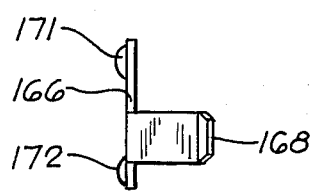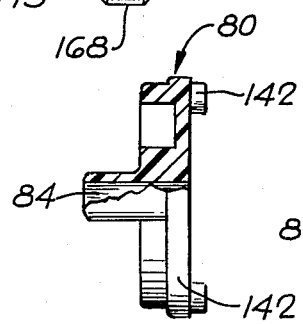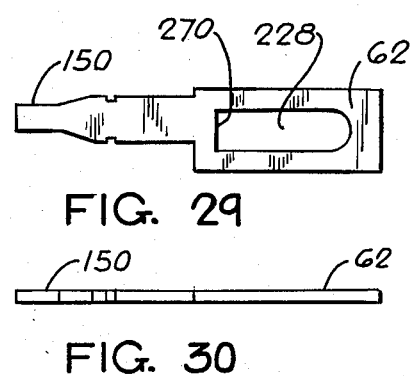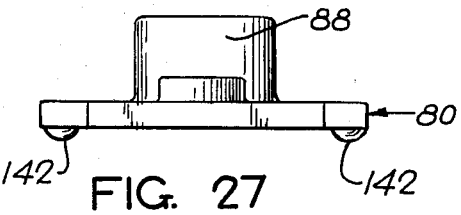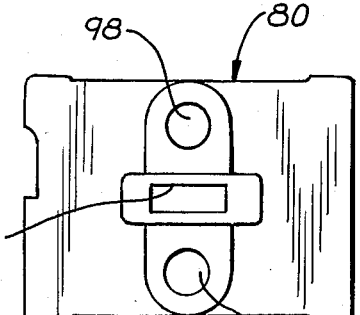

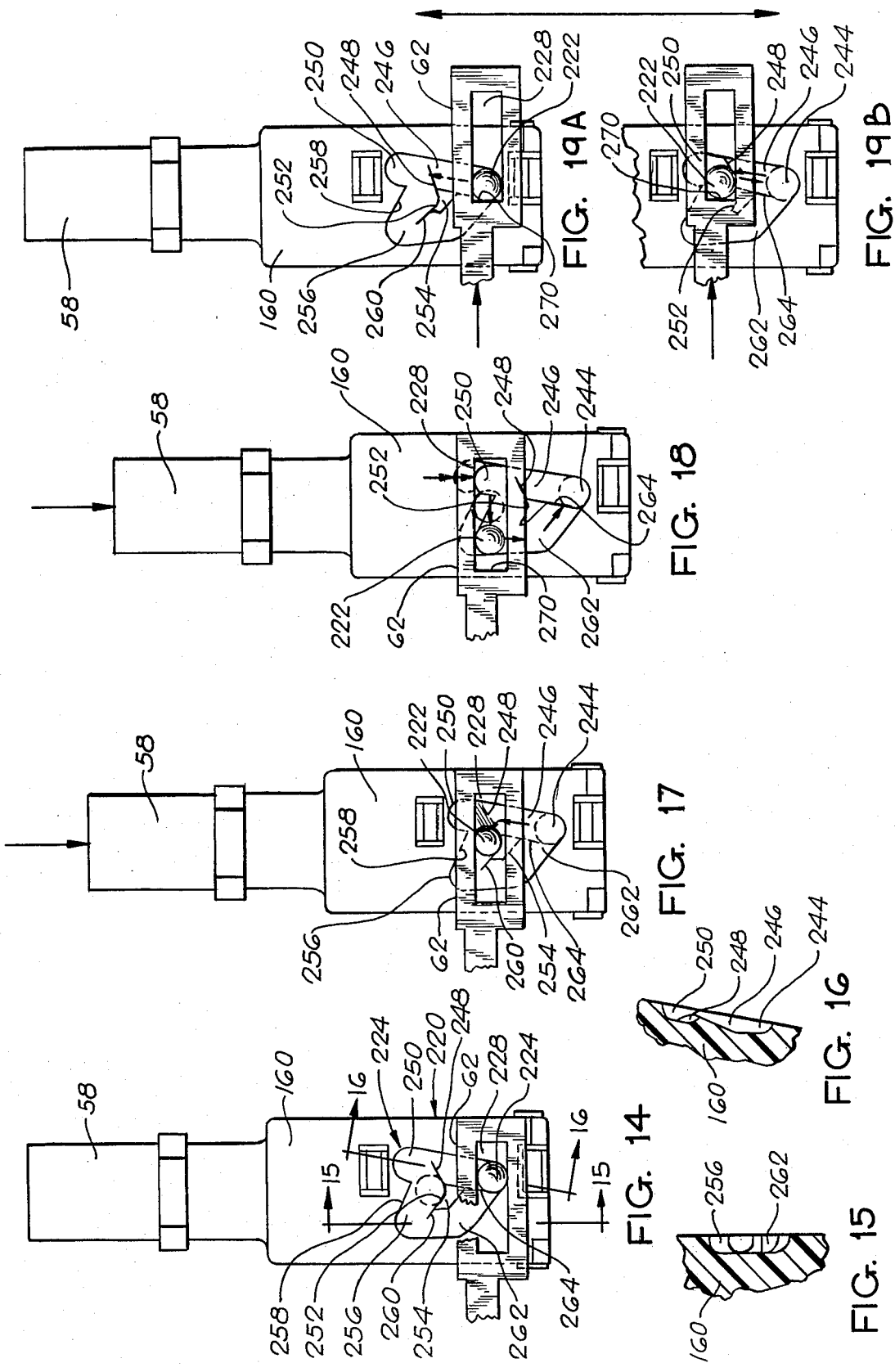

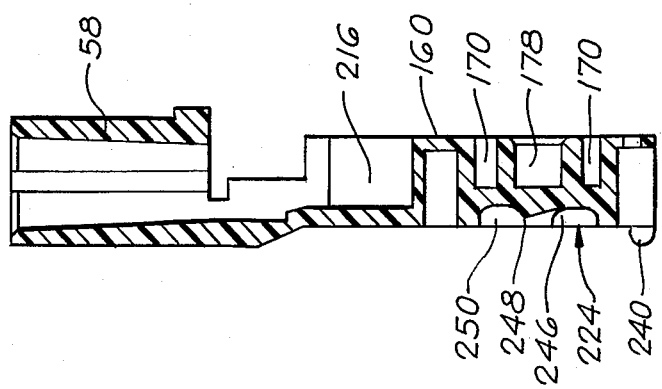
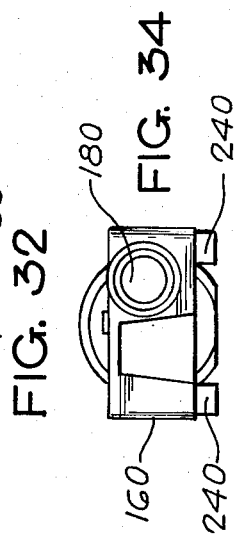
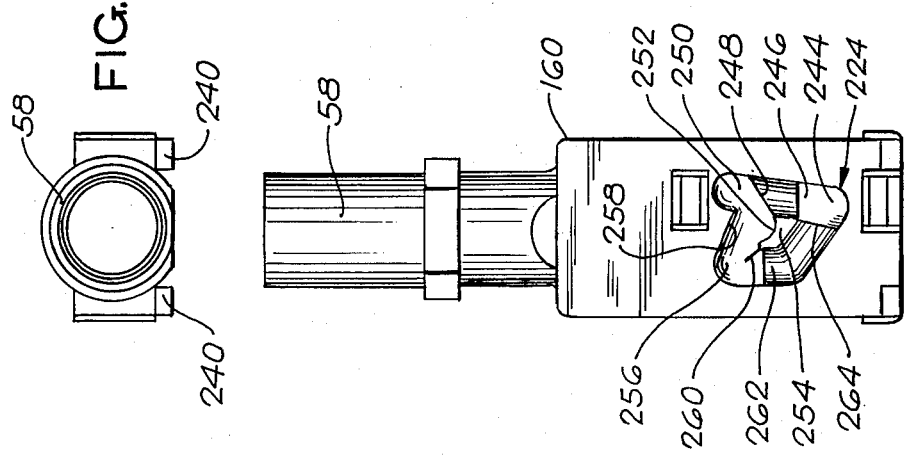

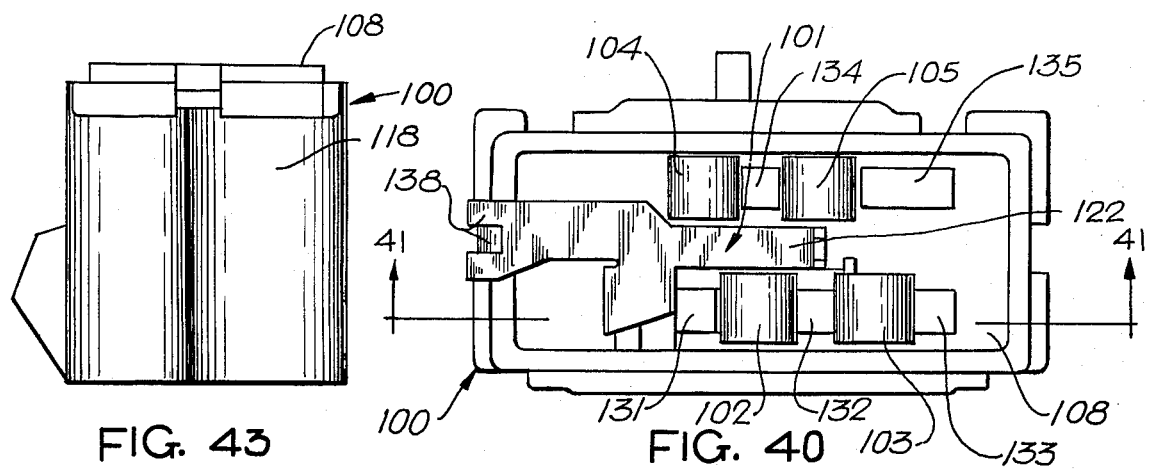
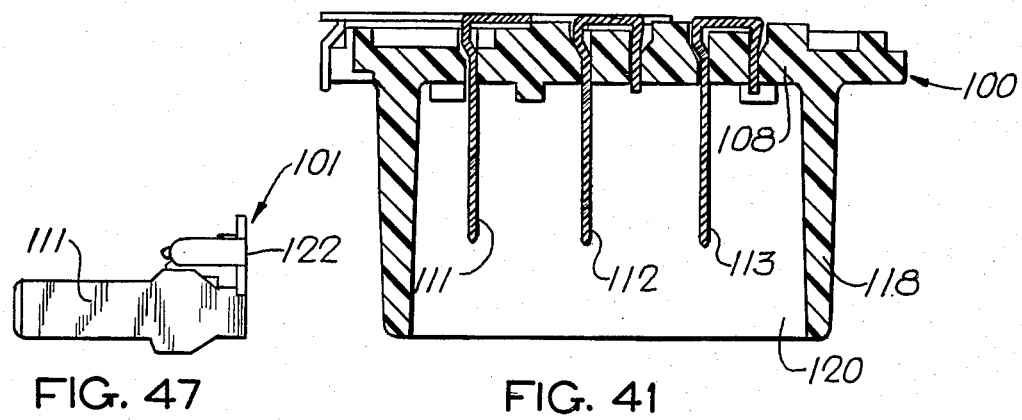
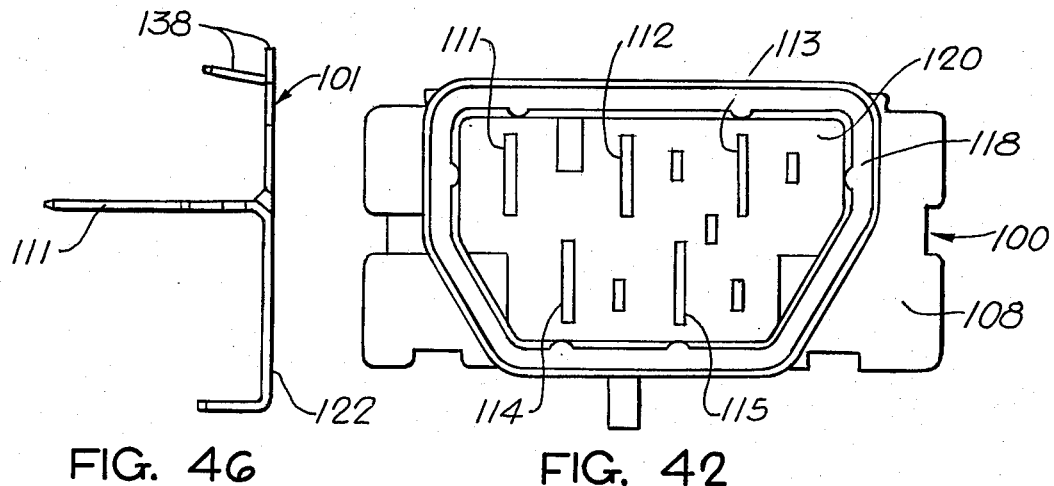
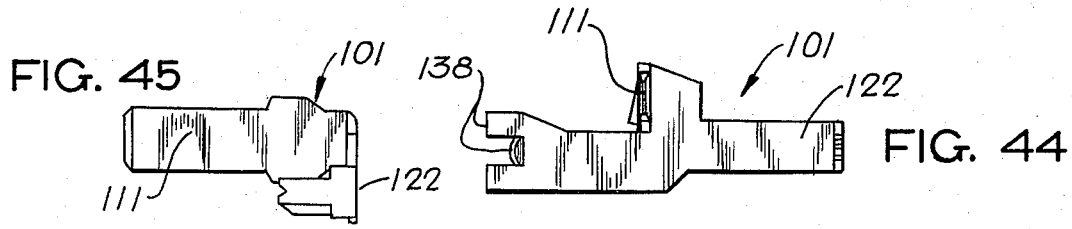

ELECTRICAL SWITCH HAVING INTERLOCKED BLOWER AND AIR CONDITIONER SWITCH COMPONENTS FOR VEHICLES

FIELD OF THE INVENTION

This invention relates to electrical switches for controlling the blower and the air conditioner for the heating and air conditioning system of an automobile, truck or other vehicle. Such switches may control the energization and the speed of the blower which circulates air to the cab of the vehicle, for both the heating and air conditioning modes of the system. Such switches may also control the energization of the air conditioning compressor. This is often done by controlling the energization of an electrically operable clutch, adapted to transmit operating power between the engine of the vehicle and the air conditioning compressor.

BACKGROUND OF THE INVENTION

In a typical heating and air conditioning system for a vehicle, such as an automobile or a truck, air is circulated into the cab of the vehicle by a blower, driven by an electric motor. A blower switch is generally provided, having several positions to regulate the speed of the motor. Thus, low, medium and high speed positions may be provided. The air circulated by the blower may be heated by a heater coil, or cooled by an air conditioner cooling coil. The air conditioner includes a compressor to compress the refrigerant, which is then cooled by a condensor coil and supplied to the cooling coil. The compressor is usually controlled by an electrically operable drive clutch, connected between the engine of the vehicle and the compressor. An air conditioner switch is generally provided for energizing the air conditioner by energizing the clutch, so that the clutch drives the compressor.

It has been found that a minimum amount of air should be continuously circulated through the cooling coil of the air conditioner, whenever the compressor is energized, to prevent frost from building up on the cooling coil. The frost results from condensation and freezing of moisture, condensed from the air. If a sufficient amount of air is circulated through the cooling coil, the air supplies sufficient heat to the cooling coil to prevent the buildup of frost. If the amount of air circulated through the cooling coil is not sufficiently great, frost can build up on the cooling coil until the cooling coil is completely clogged by the frost, so that the air conditioner becomes completely inoperative.

To prevent the buildup of frost, it has been common practice to keep the blower running at all times when the ignition switch of the vehicle is turned on. For this arrangement, the blower control switch does not have an OFF position, although the switch may have several different speed positions, such as low, medium and high. At the very least, the blower motor is kept operating at a low speed, so that the desired minimum amount of air is always circulated through the cooling coil of the air conditioner.

The continuous energization of the blower motor has the disadvantage of being wasteful of energy. Moreover, the blower causes a constant draft, which may seem uncomfortable to some persons under some conditions.

To overcome these disadvantages, it would be desirable to provide a blower switch having an OFF position, so that the blower could be deenergized and stopped completely, while providing some other means to prevent any possible frost buildup on the cooling coil of the air conditioner. One approach has been to provide extra electrical contact means in the air conditioner switch, and extra electrical wiring between the air conditioner switch and the blower motor, to be sure that the blower motor will be energized, at least at a low speed, so that a minimum flow of air will be circulated through the cooling coil whenever the air conditioner switch is moved to its ON position, so as to energize the air conditioner. This approach has the disadvantage of adding substantially to the cost of both the air conditioner switch and the electrical wiring.

OBJECTS OF THE INVENTION

One object of the present invention is to provide a new and improved electrical switch having components for controlling the blower and the air conditioner in a coordinated manner, so that the air conditioner will not be energized unless the blower is energized, to prevent the buildup of frost on the cooling coil of the air conditioner.

A further object is to provide a new and improved electrical switch in which the switching components for the blower and the air conditioner are interlocked in such a manner that the air conditioner will not be energized unless the blower is energized.

Another object is to provide a new and improved electrical switch having a blower switching component and an air conditioner switching component, together with a mechanical interlock between the switching components, so that the air conditioner will not be energized unless the blower is energized.

SUMMARY OF THE INVENTION

To accomplish these and other objects, the present invention may provide a combination blower and air conditioner switch for vehicles, comprising casing means, a blower control member movable in the casing means along a path between an OFF position at one end of such path and at least one ON position along such path, blower contact means operable by the blower control member to an open position with such blower control member in its OFF position while being operable to a closed position with the blower control member in its ON position, means for moving the blower control member along such path, an air conditioner control member movable in such casing means between circuit opening and closing positions, a return spring for biasing the air conditioner control member toward such circuit opening position, air conditioner contact means operable by the air conditioner control member to an open position with the air conditioner control member in its circuit opening position while being operable to a closed position with the air conditioner control member in its circuit closing position, latching means for latching the air conditioner control member in its circuit closing position, such latching means including a latching element, an interlock member movable between enabling and disabling positions in such casing means, such interlock member having disabling means for engaging the latching element to disable such latching means with the interlock member in its disabling position, and interlock operating means operable by the blower control member for moving the interlock member to its disabling position when the blower control member is moved to its OFF position while moving the interlock member to its enabling position when the blower control member is moved away from such OFF position, such latching means thereby being disabled from latching such air conditioner control member in such circuit closing position when the blower control member is in its OFF position, such latching means being enabled to latch such air conditioner control member in such circuit closing position when the blower control member is moved away from its OFF position to its ON position.

Preferably, such latching means may be of the alternate latching type for alternately latching and unlatching the air conditioner control member in response to successive movements of the air conditioner control member to its circuit closing position, such latching elements being movably alternately between latching and unlatching positions, such disabling means being operative to prevent movement of the latching element to its latching position.

The latching element may include a ball, the interlock member having a guide channel for receiving and guiding such ball, which may be movable alternately along such channel between latching and unlatching positions, such disabling means including a portion of the interlock member and one end of such channel for engaging the ball to prevent movement thereof to its latching position.

Preferably, the interlock operating means may include a second spring for biasing the interlock member toward its enabling position. The interlock operating means may include a portion of the blower control member which is engageable with the interlock member for moving it to its disabling position against the biasing action of such second spring when the blower control member is moved to its OFF position.

In more generalized terms, the present invention may provide a plural function control switch, comprising casing means, a first control member movable in such casing means along a path between a first position and at least a second position, means operable by the first control member for performing first and second control functions in such first and second positions, means for moving the control member along such path, a second control member movable in such casing means between third and fourth positions, biasing means for biasing such second control member toward such third position, means operable by the second control member for performing third and fourth control functions in such third and fourth positions, latching means for latching the second control member in such fourth position, such latching means including a latching element, interlock means movable between enabling and disabling positions, such interlock means having disabling means for disabling such latching element with such interlock means in such disabling position while enabling such latching element with such interlock means in such enabling position, and interlock operating means operable by such first control member for moving such interlock means to its disabling position when such first control member is moved to its first position while moving such interlock means to its enabling position when said first control member is moved away from its first position, such latching means thereby being disabled when such first control member is in its first position while being enabled to latch such second control member in its fourth position when such first control member is moved away from its first position to its second position.

Preferably, such latching means may be of the alternate latching type for alternately latching and unlatching such second control member in response to successive movements thereof to its fourth position, such latching element being movable alternately between latching and unlatching positions, such disabling means of such interlock means being operative to prevent movement of such latching element to its latching position.

The latching element may include a ball, guided by a guide element on such interlock means and movable alternately along such guide element between latching and unlatching positions, such disabling means including a portion of such interlock means for engaging such ball to prevent movement thereof to its latching position.

The interlock operating means may include second biasing means for biasing the interlock means toward its enabling position, the interlock operating means including a portion of such first control member engageable with the interlock means for moving such interlock means to its disabling position against the biasing action of such second biasing means when the first control member is moved to its first position.

BRIEF DESCRIPTION OF DRAWINGS

Further objects, advantages and features of the present invention will appear from the following description, taken with the accompanying drawings, in which:

FIG. 6 is a sectional view, partly in section, generally along the horizontal line 6—6 in FIG. 2, the blower switch component being shown in its OFF position.

FIG. 7 is a sectional view, similar to FIG. 6, but with the blower switch component in one of its ON positions, and with the air conditioner push button latched in its depressed or ON position.

FIG. 8 is a side elevation of the switch, showing particularly the air conditioner switch component.

FIG. 9 is a sectional view, taken generally along the line 9—9 in FIG. 6.

FIG. 10 is a fragmentary elevational view showing the terminal head and the fixed contacts for the blower switch component, the blower switch contactor being shown in broken lines, the view being taken generally along the line 10—10 in FIG. 6.

FIG. 11 is a separate view of the blower switch contactor and its associated carriage.

FIG. 12 is a sectional view, taken generally along the line 12—12 in FIG. 9, showing the terminal head and fixed contacts for the air conditioner switch component, the corresponding contactor being shown in broken lines.

FIG. 13 is a separate view showing the contactor and the associated carriage for the air conditioner switch component.

FIG. 14 is an enlarged view showing the opposite side of the carriage for the air conditioner switch component, the view also showing the latching ball and the latch disabling member.

FIGS. 15 and 16 are fragmentary sections, taken generally along the lines 15—15 and 16—16 in FIG. 14, to show details of the latching recess in the carriage of FIG. 14.

FIG. 17 is a view similar to FIG. 14, but showing the manner in which the ball latches the carriage in its depressed position.

FIG. 18 is a view similar to FIGS. 14 and 17, but showing the manner in which the carriage is unlatched by a subsequent depression of the carriage.

FIG. 19A is a view similar to FIG. 14, but showing the manner in which the disabling member disables the latching means by preventing the latching ball from moving to its latching position, the carriage being shown in its initial or extended position.

FIG. 19B is a fragmentary view similar to FIG. 19A, but showing the carriage in its depressed position.

FIG. 20 is an elevational view of the contactor for the lower switch component.

FIGS. 21 and 22 are two different edge views of the contactor of FIG. 20.

FIG. 23 is a plan view of the contactor for the air conditioner switch component.

FIGS. 24 and 25 are two different edge views of the contactor of FIG. 23.

FIG. 26 is an elevational view of the carriage for the blower switch component.

FIGS. 27 and 28 are two different edge views of the carriage of FIG. 26.

FIG. 29 is a plan view of the disabling member.

FIG. 30 is an edge view of the disabling member.

FIG. 31 is a bottom plan view of the carriage for the air conditioner switch component.

FIG. 32 is a top plan view of the carriage of FIG. 31, partly in section.

FIG. 33 is a section through such carriage, taken generally along the line 33—33 in FIG. 32.

FIGS. 34 and 35 are opposite end views of the carriage of FIGS. 31—33.

FIG. 40 is a separate front view of the terminal head and fixed contacts for the blower switch component.

FIG. 41 is a horizontal section, taken generally along the line 41—41 in FIG. 40.

FIG. 42 is a rear view of the terminal head of FIG. 40.

FIG. 43 is a side view of the terminal head of FIG. 40.

FIG. 44 is a rear view of a terminal and contact member for the terminal head of FIG. 40.

FIG. 45 is a right hand side view of the member of FIG. 44.

FIG. 46 is a bottom plan view of the member of FIG. 44.

FIG. 47 is a left hand side view of the member of FIG. 44.

DETAILED DESCRIPTION OF ILLUSTRATIVE EMBODIMENT

Figures 1, 4, 5:
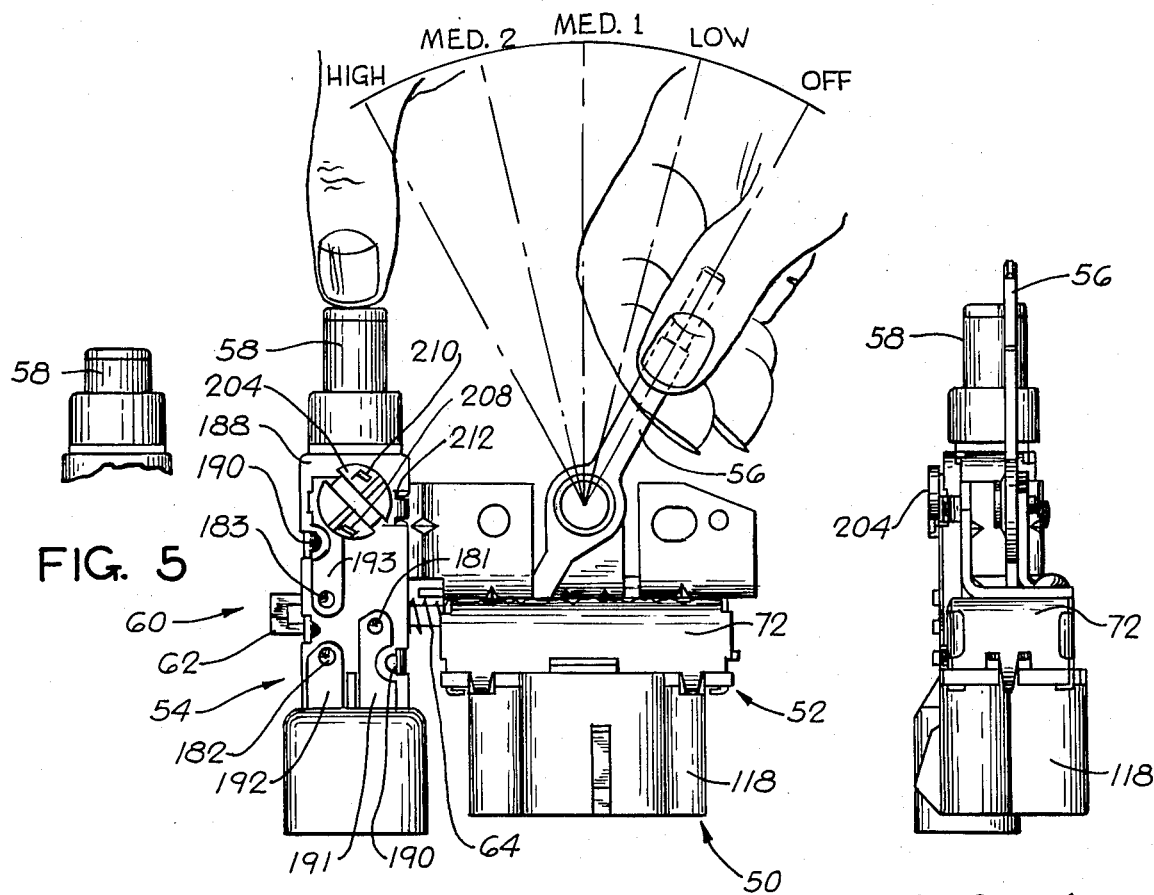
FIG. 1 is a top plan view of a combination blower and air conditioner switch, to be described as an illustrative embodiment of the present invention.
FIG. 4 is a side elevation of the switch.
FIG. 5 is a fragmentary view, similar to a portion of FIG. 1, showing the depressed position of the push button for the air conditioner switch component of the switch of FIG. 1.
Figure 3:
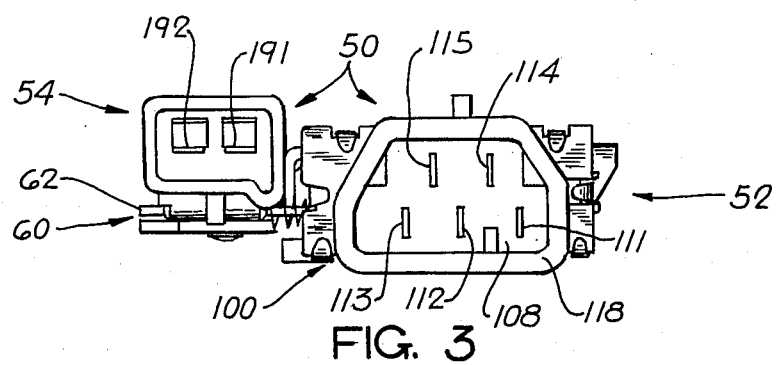
Figure 37:
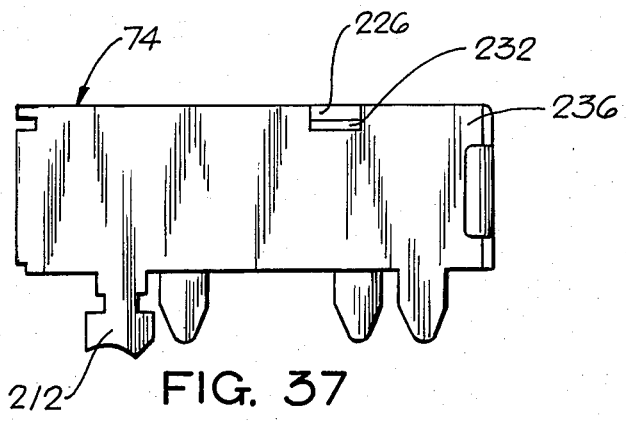
FIGS. 37 and 38 are opposite side views of the housing of FIG. 36.
Figure 36:
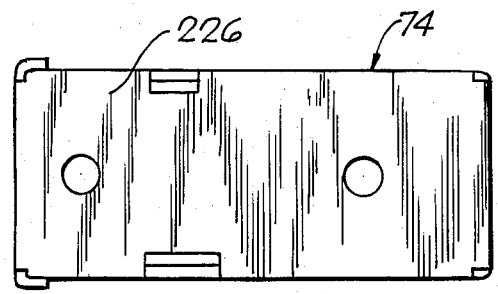
FIG. 36 is a bottom plan view of the housing for the air conditioner switch component.
Figure 39:
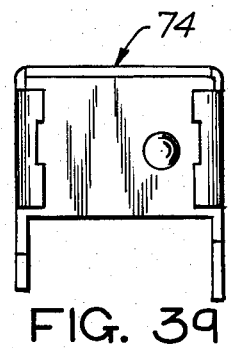
FIG. 39 is an end view of the housing of FIG. 36.
Figure 38:
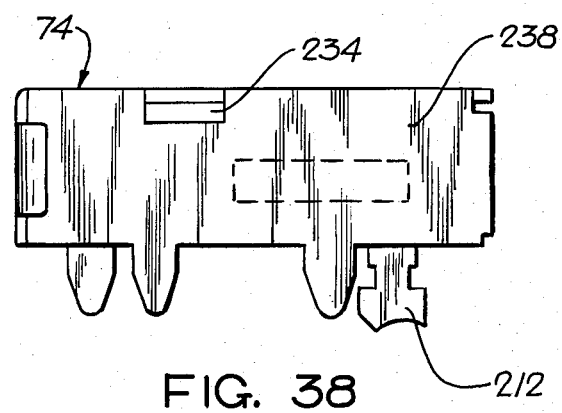

As indicated above, the drawings illustrate an illustrative embodiment of the present invention, in the form of a combined electrical switch 50 having a blower switch component 52 which is interlocked with an air conditioner switch component 54, intended particularly for controlling the heating and air conditioning system of an automobile, truck or other vehicle. The blower switch component 52 has a movable operating member in the form of a swingable control lever 56 which is movable to a series of positions for controlling the energization and the speed of the blower motor in the heating and air conditioning system. As shown in FIG. 1, the lever 56 is movable to an OFF position, in which the blower motor is deenergized, a LOW position, in which the blower motor is energized at a low speed, two medium speed positions MED 1 and MED 2, and a high speed position HIGH.

The air conditioner switch component 54 comprises a movable operating member in the form of a push button 58, which is normally biased outwardly to its OFF position, as shown in FIG. 1, in which the air conditioner is deenergized, but is adapted to be depressed or moved inwardly to its ON position, as shown in FIG. 5, in which the air conditioner is energized. As will be described presently, the air conditioner switch component 54 includes means for latching the operating push button 58 in its depressed or ON position. However, the combined switch 50 includes interlock means 60 for preventing the latching of the push button 58 when the blower switch lever 56 is in its OFF position. Such interlock means 60 may include a movable interlock member 62 which extends between the blower switch component 52 and the air conditioner switch component 54. The latch disabling action of the interlock means 60 occurs only when the blower switch lever 56 is in its OFF position. The latching of the push button 58 is enabled when the switch lever 56 is moved away from its OFF position to any of its ON position, designated LOW, MED1, MED2 and HIGH in FIG. 1.

In this way, the push button 58 can be latched in its ON position, to energize the air conditioner, when the blower motor is energized at low speed or at any higher speed, so that sufficient air is circulated by the blower to prevent the building up of frost on the air conditioner cooling coil. When the blower switch lever 56 is in its OFF position, to deenergize the blower motor, the latching of the air conditioner push button 58 is disabled to avoid energizing the air conditioner when the blower is not circulating air through the cooling coil. Such operation of the air conditioner would be likely to cause frost to build up on the cooling coil.

The air conditioner switch component 54 is of the alternate latching type, in which the push button 58 is alternately latched and unlatched, in response to successive movements of the push button to its fully depressed position. The push button 58 is latched in a partially depressed position, in which the air conditioner switch component 54 is ON or closed. A switch of this alternate latching type is often referred to as a Push-Push switch, with reference to the fact that one push of the push button 58 causes it to latch in its ON position, while the next push causes the push button 58 to return outwardly to its OFF position.

The movable interlock member 62 is preferably biased toward its enabling position by a return spring 64. When the blower switch lever 56 is moved to its OFF position, the interlock member 62 is moved to its disabling position, against the biasing action of the spring 64, so that the latching of the push button 58 is disabled.

Additional details of the combined switch 50 are shown in FIGS. 6–9. The combined switch 50 comprises casing means 70, including a blower switch casing 72, an air conditioner switch casing 74, and a common mounting bracket 76, on which the casings 72 and 74 are securely mounted.

The blower switch component 52 comprises a movable control member in the form of a carriage 80 which is movable longitudinally within the casing 72 along a predetermined path. Details of the carriage 80 are shown in FIGS. 26, 27 and 28, which shows the carriage separately on an enlarged scale. The operating lever 56 is adapted to move the carriage 80 along its path. For this purpose, the lever 56 has an arm 82 which is slidably received in a slot 84, formed in the carriage 80. Preferably, the carriage 80 is made of a resinous plastic material or some other material which is an electrical insulator.

The movable carriage 80 is adapted to operate the contact means of the blower switch component 52. As shown, a movable contactor 86 is mounted on the carriage 80, for movement therewith along its path. The contactor 86 is shown separately in FIGS. 20, 21 and 22. Generally, the contactor 86 is in the form of a plate made of copper or some other electrically conductive material. The contactor 86 is mounted on the carriage 80 and is caused to move therewith by a projection 88 extending from one side of the carriage 80 and slidably received in the corresponding slot 90 in the contactor 86. In FIG. 11, the contactor 86 is shown mounted on the carriage 80. The illustrated contactor 86 is formed with three contact points 91, 92 and 93 projecting from the rear side thereof and shown as being spherically rounded in shape. The other side of the contactor 86 is formed with a pair of points or bosses 94 which are adapted to receive and locate coil springs 96, adapted to be compressed between the contactor 86 and the carriage 80. The coil springs 96 are received and located in sockets or recesses 98, formed in the carriage 80.

The blower switch component 52 comprises a terminal head 100 which carries a set of fixed contacts 101, 102, 103, 104 and 105, as shown to best advantage in FIG. 40. The terminal head 100 and the contacts 101-105 are shown separately in FIGS. 40-43. The first contact 101 is shown separately in FIGS. 44-47. The fixed contacts 101-105 are respectively engageable by the contactor 86 as it is moved along its path in the blower switch component 52. The terminal head 100 includes a terminal board or plate 108 for supporting the fixed contacts 101-105. The supporting plate 108 is made of an electrically insulating material, such as a suitable resinuous plastic material. The insulating plate 108 is secured to the rear of the casing 72, as by means of bent over tabs, formed on the casing 72. The plate 108 forms the rear wall of the casing 72.

In order that the contacts 101-105 may be connected to external circuit wires, the contacts 101-105 are provided with terminals in the form of lugs or prongs 111, 112, 113, 114 and 115, which in this case are formed in one piece with the respective contacts 101-105. The terminal prongs 111-115 extend rearwardly through corresponding slots in the insulating plate 108 and are adapted to receive a removable electrical connector, for connecting the switch contacts 101-105 to the electrical circuit for the blower motor. In this case, the terminal head 100 is formed with a rearwardly projecting shroud or wall 118 which forms a protective perimeter around the contact prongs 111-115, but is open to the rear to form an opening 120 adapted to receive an electrical connector.

The fixed contacts 101-105 are selectively engageable by the contact points 91, 92 and 93 on the movable contactor 86. The springs 96 provide spring biasing forces between the contactor 86 and the fixed contacts 101-105.

As shown in FIG. 40, the fixed contact 101 includes an elongated, centrally disposed contact bar 122 which is slidably engaged by the contact pont 91, throughout the range of movement of the contactor 86. The contacts 102 and 103 are localized and are in a row parallel with the contact bar 122 and along one side thereof. The contacts 104 and 105 are localized and are in another row, parallel with the contact bar 122 and along the opposite side thereof.

As shown in FIG. 40, insulating points or bosses 131, 132 and 133 are formed on the insulating plate 108 so as to alternate with the fixed contacts 102 and 103. Similarly, insulating points or bosses 134 and 135 are formed on the insulating plate 108 so as to alternate with the fixed contacts 104 and 105.

In the OFF position of the blower switch component 52, the contact point 91 on the contactor 86 engages the central contact bar 122 on the contact 101, while the contact points 92 and 93 engage the insulating bosses 133 and 135. Thus, the contactor 86 does not complete any electrical circuit.

In the LOW position of the switch, the contact point 92 engages the fixed contact 103, while the contact point 93 still engages the insulating boss 135. The contact point 91 continues to engage the contact bar 122, in all of the positions of the switch.

In the MED1 position of the switch component 52, the contact point 92 engages the insulating boss 132, while the contact point 93 engages the fixed contact 105.

In the MED2 position of the switch component 52, the contact point 92 engages the contact 102, while the contact point 93 engages the insulating boss 134.

In the HIGH position of the switch component 52, the contact point 92 engages the insulating boss 131, while the contact point 93 engages the contact 104.

As shown in FIG. 40, the fixed contact 101 has a portion 138 which is adapted to engage a portion of the metal casing 72 for the blower switch component 52, so as to provide an electrical connection between the contact 101 and the casing 72. The portion 138 may engage a tab 140 on the casing 72.

The blower switch component 52 is preferably provided with detent means for lightly detaining the movable carriage 80 in each of its five positions. Such detent means may include interengageable detent elements on the carriage 80 and on the casing 72. As shown in FIGS. 27 and 28, the detent elements on the carriage 80 may be in the form of detent bumps or points 142 projecting from one side of the carriage 80 at the four corners thereof. As shown in FIGS. 6 and 7, the detent elements on the casing 72 may be in the form of detent recesses 144 alternating with a series of detent bumps 146 projecting rearwardly from the front wall of the casing 72. The coil springs 96 are compressed between the contactor 86 and the carriage 80, so that the coil springs 96 are effective to bias the detent bumps 142, formed on the carriage 80, against the detent recesses and bumps 144 and 146 on the casing 72.

The interlock member 62 is adapted to be operated by the movement of the carriage 80 to its OFF position in the casing 72 of the blower switch component 52. Thus, as shown in FIGS. 6 and 7, the interlock member 62 has an end portion or finger 150 which extends into the casing 72 for the blower switch component 52 and is adapted to be engaged by the carriage 80 when it is moved to its OFF position, as shown in FIG. 6. The carriage pushes the interlock member 62 to the right to its latch disabling position, as shown in FIG. 6, against the biasing action of the return spring 64. When the carriage 80 is moved away from its OFF position to any of its ON positions, the carriage 80 is moved away from the end portion 150 of the interlock member 62, whereupon the interlock member 62 is moved to the left to its latch enabling position by the spring 64, as shown in FIG. 7. The end portion 150 of the interlock member 62 extends through a corresponding slot in the wall of the casing 72.

Additional details of the air conditioner switch component 54 are shown in FIG. 9. The operating member or push button 58 comprises the front portion of a carriage 160 which is slidable longitudinally in the casing 74. The push button 58 is biased outwardly to its OFF position by a return spring 162, compressed between the rear end of the carriage 160 and the rear wall 164 of the casing 74.

The air conditioner switch component 54 comprises contact means for controlling the energization of the air conditioner circuit. Such contact means may include an electrically conductive contactor 166 which is movable with the carriage 160. In FIG. 13, the contactor 166 and the carriage 160 are shown as a separate subassembly. The contactor 166 is shown separately in FIGS. 23, 24 and 25.

The push button 58 and the carriage 160 are preferably made in one piece of an electrically insulating material, such as a suitable resinous plastic material. The contactor 166 is preferably made of copper or some other suitable electrically conductive material. It will be seen that the contactor 166 is generally in the form of a metal plate having a pair of tabs 168 which are received in corresponding slots 170 in the carriage 160, so that the contactor 166 is movable longitudinally with the carriage, while being slidable laterally relative to the carriage. The illustrated contactor 166 is formed with three contact points 171, 172 and 173 which preferably are spherically rounded. The contact points 171-173 project from one side of the contactor 166, away from the carriage 160.

As shown in FIG. 9, the contactor 166 is biased away from the carriage 160 by a coil spring 176 which is compressed between the carriage and the contactor. The carriage 160 is shown separately in FIGS. 31-35. It will be seen that the carriage 160 is formed with a recess or socket 178 for receiving and locating the coil spring 176. As shown in FIG. 34, the rear end of the carriage 160 is formed with a recess or socket 180 for receiving and locating the return spring 162.

The movable contactor 166 is selectively engageable with fixed contact means, which may comprise fixed contacts 181, 182 and 183, shown to best advantage in FIG. 12, in which the contacts are shown separately, as mounted on a terminal head 186. The illustrated contacts 181-183 are in the form of contact rivets, mounted on and extending through an insulating board or plate 188, made of a resinous plastic or some other suitable material. The terminal board 188 forms the upper wall of the casing 74 for the air conditioner switch component 54 and is secured to the casing by bent over tabs 190, as shown in FIG. 1, which illustrates the upper or outer side of the terminal board 188.

As shown in FIG. 1, terminals 191, 192 and 193 are secured to the contact rivets 181, 182 and 183. The terminals 191 and 192 are in the form of flat lugs or prongs, projecting rearwardly and adapted to receive a removable electrical connector. The terminal head 186 includes a protective cup-shaped shroud 196, extending around the contact prongs 191 and 192, and having a rear opening 198 for receiving the connector. The shroud 196 may be formed in one piece with the insulating terminal board 188.

Figure 2:
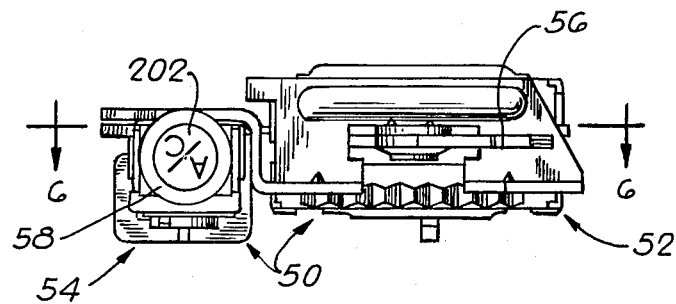
FIGS. 2 and 3 are front and rear elevational views of the switch of FIG. 1.

The third terminal 193 provides a connection to a small signal lamp 200 which is mounted within the movable carriage 160 to illuminate the interior of the push button 58 when the air conditioner switch component 52 is in its ON position. It will be seen that the push button 58 is hollow and tubular in shape. The front end of the push button 58 is provided with a light transmitting window member 202 which is preferably marked with the legend A/C, as shown in FIG. 2.

The lamp 200 is mounted on a lamp mounting member 204 which is removably insertable into an opening 206, formed in the terminal board 188, as shown in FIGS. 9 and 12. A bayonet type lock may be provided between the lamp mounting member 204 and the opening 206. The lamp 200 may be of the type having terminals in the form of flexible wires 208 and 210, wrapped around portions of the lamp mounting member 204. The lamp wire 208 is engageable with the terminal 193, while the lamp wire 210 is engageable with a terminal log or tab 212, bent over from the metal casing 74 of the air conditioner switch component 54. Thus, one terminal of the lamp 200 is grounded to the casing 74, while the other lamp terminal is connected to the switch contact 183.

As shown in FIGS. 9, 32 and 33, the carriage 160 has a sizable hollow space or cavity 216 affording ample clearance for the lamp 200. The cavity 216 connects with the hollow interior of the push button 58, so that the lamp 200 can illuminate the translucent window 202 at the front end of the push button 58.

When the push button 58 is in its initial extended position, the contactor 166 does not engage any of the fixed contacts 181, 182 and 183. When the push button 58 is pushed rearwardly against the biasing action of the spring 162, the contact points 171, 172 and 173 on the contactor 176 engage the respective fixed contacts 181, 182 and 183. This ON position of the contactor 166 is shown in broken lines in FIG. 12. The contactor 166 forms a conductive bridge, so that all three of the fixed contacts 181, 182 and 183 are connected together. In the circuits for the air conditioner, the fixed contacts 181 and 182 may be connected to the ungrounded side of the battery and to the air conditioner clutch. The contact 183 is connected to the lamp 200. Thus, both the air conditioner clutch and the lamp 200 are energized when the contactor 166 is moved into engagement with the fixed contacts 181, 182 and 183. When the push button 58 is allowed to return to its extended position, both the air conditioner clutch and the lamp 200 are deenergized.

As previously indicated, the air conditioner switch component 54 includes a latching mechanism 220 for latching the push button 58 in its ON position, in which it closes the energizing circuit for the air conditioner. The latching mechanism 220 is shown to best advantage in FIGS. 14–19B. The latching mechanism 220 is of the alternate latching type, whereby the push button 58 is alternately latched and unlatched, in response to successive pushes of the push button 58 to its fully depressed position. When the push button 58 is in its OFF or extended position, and the push button is pushed to its fully depressed position and then is released, the push button 58 is latched by the mechanism 220 in a partially depressed position, in which the switch is closed or ON. When the push button 58 is again pushed to its fully depressed position and released, the push button is unlatched by the mechanism 220, so that the push button is returned to its fully extended or OFF position.

As shown in FIG. 14, the latching mechanism 220 comprises a ball 222 which is employed as a latching element. The ball 222 is received in a latching track or recess 224, formed in one side of the movable switch carriage 160. In this case, the contactor 166 is mounted on one side of the carriage 160, while the latching track 224 is formed in the opposite side of the carriage 160. The latching ball 222 is confined in the track 224 by one wall 226 of the casing 74, such wall being the lower wall of the casing in this instance. The latching ball 222 is also confined in a slot 228 which is formed in the movable interlock member 62. The guide slot 228 extends at right angles or transversely to the direction of movement of the switch carriage 160. The interlock member 62 is positioned between the switch carriage 160 and the casing wall 226. The carriage 160 is biased toward the interlock member 62 by the coil spring 176 which also biases the contactor 166 toward the fixed contacts 181-183 on the terminal board 188. The interlock member 62 is slidably received in a pair of slots 232 and 234, formed in opposite side walls 236 and 238 of the casing 74, as shown to best advantage in FIGS. 36-39, which show the casing 74 separately. The carriage 160 preferably has a pair of bosses 240 adapted to ride along the lower wall 226 of the casing 74.

The details of the latching track 224 are shown in FIGS. 14-19B, which also show the latching sequence. The latching track 224 forms a complete circuit or loop which is generally triangular in shape, as will be evident from FIG. 14. When the push button 58 and the carriage 160 are moved longitudinally, the transverse guide slot 228 in the interlock member 62 prevents the ball 222 from moving longitudinally, but permits the ball to move laterally along the slot 228.

FIG. 14 shows the initial position of the push button 58, in which the push button is in its fully extended or OFF position. The ball 222 is in a starting or unlatched position 224 at the beginning of a first groove portion 246 of the ball track 224.

When the push button 58 is depressed, the track 224 is moved relative to the ball, so that the ball 222 has relative movement along the first groove portion 246 of the track 224, until the ball 222 snaps past a diagonal ridge or cam 248, projecting downwardly into the track 224, as shown in FIG. 16. The ball 222 snaps past the first ridge 248 into a second groove portion 250 of the ball track 224. When the push button 58 is allowed to return outwardly, the ridge 248 prevents the ball 222 from returning into the first groove portion 246. Instead, the ridge 248 causes the ball 222 to have relative movement along the second groove portion 250 until the ball 222 is engaged by a latching seat 252 formed on an island 254 near the center of the generally triangular track 224. In this way, the push button 58 is latched in a partially depressed or ON position.

The latching position of the ball 222, as shown in FIG. 17, is the end of the second groove portion and the beginning of a third groove portion 256. When the push button 58 is again depressed, the ball 222 is caused to travel along the third groove portion 256 by its diagonal front wall 258, until the ball 22 snaps past a second ridge 260, into a fourth groove portion 262. The ridge 260 prevents the ball 222 from returning to its latching position, when the push button 58 is allowed to return outwardly. Instead, the ball travels along the fourth groove portion 262 which is of a dog leg shape, so that the ball is caused to travel back to its starting position 244. Just before the ball 222 reaches its starting position 244, the ball snaps past a third ridge 264 which prevents the ball 222 from returning into the fourth groove portion 262 when the push button 58 is again depressed.

When the ball 222 snaps past the ridges 248, 260 and 264, the carriage 160 is displaced momentarily, against the biasing action of the spring 176.

The latching disabling action of the interlock member 62 is shown in FIGS. 19A and 19B, in which the interlock member 62 is shown in its disabling position. It will be recalled that the interlock member 62 is moved to its disabling position by the blower switch carriage 80 when it is moved to its OFF position, as shown in FIG. 6. When the interlock member 62 is in its disabling position, as shown in FIGS. 19A and 19B, the latching ball 222 is retained by the left hand end wall 270 of the guide slot 228 in the member 62, so that the ball 222 is prevented from moving into its latching position of FIG. 17. The end wall 270 of the slot 228 prevents the ball 222 from moving into engagement with the latching seat 252. Thus, the latching ball 222 is disabled from latching the push button 58.

In FIG. 19A, the push button 58 is shown in its extended position. When the push button 58 is depressed, there is relative travelling movement of the ball 222 along the first groove portion 246 of the ball track 224, and the ball 222 snaps past the first ridge 248, as before. However, further lateral movement of the ball 222 is arrested by the end wall 270 of the guide slots 228, so that the ball is stopped short of latching engagement with the latching seat 252, as shown in FIG. 19B. When the push button 58 is released and allowed to travel outwardly, the ball 222 is pushed back past the ridge 248 into the first groove portion 246, so that the ball returns to its initial position 244. Thus, the push button 58 returns outwardly to its fully extended position, without being latched.

Accordingly, the push button 58 of the air conditioner switch component 54 cannot be latched in its depressed or ON position when the blower switch component 52 is in its OFF position. This interlocking action prevents the air conditioner from running continuously when the blower is not energized. Accordingly, any buildup of frost on the cooling coil is prevented.

The interlock member 62 is also effective to unlatch the air conditioner switch component 54 if the blower switch component 52 is moved to its OFF position when the air conditioner switch component 54 is latched in its ON position. The latched position of the latching ball 222 is shown in FIG. 17. If the blower switch carriage 80 is moved to its OFF position, as shown in FIG. 6, the interlock member 62 is moved to the position shown in FIG. 19B, in which the end wall 270 of the guide slot 228 pushes the ball 222 away from the latching seat 252, so that the ball is pushed back, past the first ridge 248 and into the first groove portion 246 of the ball track 224. The push button 58 is thus released for outward movement to its OFF position by the return spring 162.

Accordingly, the air conditioner switch component 54 is automatically returned to its OFF position if the blower switch component 52 is moved to its OFF position. This interlocking action avoids continued operation of the air conditioner if the blower is stopped. Such continued operation of the air conditioner might cause the building up of frost on the cooling coil of the air conditioner, due to insufficient air flow.

The provision of the separate fixed contact 183 for the pilot lamp 200 makes it possible to isolate the lamp circuit from the circuit for the air conditioner clutch, so as to protect the lamp 200 from any possible burnout due to the electrical energy stored in the inductive winding of the clutch. The fixed contacts 181, 182 and 183 and the contact points 171, 172 and 173 on the contactor 166 are preferably arranged so that the lamp circuit is broken by the disengagement of the point 173 from the contact 183, before the clutch circuit is broken by the disengagement of the points 171 and 172 from the contacts 181 and 182. Thus, the lamp circuit is broken and isolated from the clutch circuit, before the clutch circuit is broken. To achieve this isolation, the spacing between the points 172 and 173 is preferably greater than the spacing between the contacts 182 and 183, as shown in FIG. 12. Moreover, the locations of the contacts 181 and 183 are such, in relation to the locations of the points 171 and 173, that the point 171 is engaging the contact 181 when the point 173 has been moved out of engagement with the contact 183.

When the air conditioner push button 58 travels outwardly, a break occurs between the point 173 and the contact 183, to open the lamp circuit, before the clutch circuit is opened by the breaks between the points 171 and 172 and the corresponding contacts 181 and 182 for the clutch and the battery.

We claim:

1. A combination blower and air conditioner switch for vehicles, comprising
    casing means,
    a blower control member movable in said casing means along a path between an OFF position at one end of said path and at least one ON position along said path,
    blower contact means operable by said blower control member to an open position with said blower control member in said OFF position while being operable to a closed position with said blower control member in said ON position,
    means for moving said blower control member along said path,
    an air conditioner control member movable in said casing means between circuit opening and closing positions,
    a return spring for biasing said air conditioner control member toward said circuit opening position,
    air conditioner contact means operable by said air conditioner control member to an open position with said air conditioner control member in said circuit opening position while being operable to a closed position with said air conditioner control member in said circuit closing position,
    latching means for latching said air conditioner control member in said circuit closing position,
    said latching means including a latching element,
    an interlock member movable between enabling and disabling positions in said casing means,
    said interlock member having disabling means for engaging said latching element to disable said latching means with said interlock member in said disabling position,
    and interlock operating means operable by said blower control member for moving said interlock member to said disabling position when said blower control member is moved to said OFF position while moving said interlock member to said enabling position when said blower control member is moved away from said OFF position,
    said latching means thereby being disabled from latching said air conditioner control member in said circuit closing position when said blower control member is in its OFF position,
    said latching means being enabled to latch said air conditioner control member in said circuit closing position when said blower control member is moved away from said OFF position to said ON position.

2. A switch according to claim 1, in which
    said air conditioner control member includes a push button actuator movable between extended and depressed positions corresponding with said circuit opening and closing positions,
    said latching means being of the push-push type for alternately latching and unlatching said air conditioner control member in response to successive pushes of said push button actuator to its depressed position,
    said latching element being movable alternately between unlatching and latching positions,
    said disabling means of said interlock member being operative to prevent movement of said latching element to its latching position when said interlock member is in said disabling position.

3. A switch according to claim 1,
    said latching means being of the alternate latching type for alternately latching and unlatching said air conditioner control member in response to successive movements of said air conditioner control member to its circuit closing position,
    said latching element being movable alternately between latching and unlatching positions,
    said disabling means of said interlock member being operative to prevent movement of said latching element to its latching position.

4. A switch according to claim 1,
    said latching means being of the alternate latching type for alternately latching and unlatching said air conditioner control member in response to successive movements of said air conditioner control member to said circuit closing position,
    said latching element including a ball,
    said interlock member having a guide channel for receiving and guiding said ball,
    said ball being movable alternately along said channel between latching and unlatching positions,
    said disabling means of said interlock member including a portion of said interlock member at one end of said channel for engaging said ball to prevent movement of said ball to its latching position.

5. A switch according to claim 4,
    including a second spring for biasing said interlock member toward its enabling position,
    said second spring being included in said interlock operating means,
    said interlock operating means comprising a portion of said blower control member engageable with said interlock member for moving said interlock member to its disabling position against the biasing action of said second spring when said blower control member is moved to its OFF position.

6. A switch according to claim 1,
including a second spring for biasing said interlock member toward its enabling position,
said interlock operating means comprising a portion of said blower control member for engaging and moving said interlock member to its disabling position against the biasing action of said second spring when said blower control member is moved to its OFF position.

7. A switch according to claim 1,
said interlock operating means icluding a second spring for biasing said interlock member toward its enabling position,
said interlock operating means including a portion of said blower control member for engaging and moving said interlock member to its disabling position against the biasing action of said second spring when said blower control member is moved to its OFF position,
said latching means being of the alternate latching type for alternately latching and unlatching said air conditioner control member in response to successive movements thereof to its circuit closing position,
said latching element being movable alternately between latching and unlatching positions,
said disabling means of said interlock member being operative to prevent movement of said latching element to its latching position.

8. A plural function control switch, comprising
casing means,
a first control member movable in said casing means along a path between an OFF position at one end of said path and at least one ON position along said path,
means operable by said first control member for performing a first deenergizing function in said OFF position while performing a first energizing function in said ON position,
means for moving said control member along said path,
a second control member movable in said casing means between deenergizing and energizing positions,
biasing means for biasing said second control member toward said deenergizing position,
means operable by said second control member for performing a second deenergizing function in said deenergizing position while performing a second energizing function in said energizing position,
latching means for latching said second control member in said energizing position,
said latching means including a latching element,
an interlock member movable between enabling and disabling positions in said casing means,
said interlock member having disabling means for disabling said latching element with said interlock member in said disabling position while enabling said latching element with said interlock member in said enabling position,
and interlock operating means operable by said first control member for moving said interlock member to said disabling position when said first control member is moved to said OFF position while moving said interlock member to said enabling position when said first control member is moved away from said OFF position,
said latching means thereby being disabled when said first control member is in its OFF position while being enabled to latch said second control member in its energizing position when said first control member is moved away from said OFF position to said ON position.

9. A switch according to claim 8,
said latching means being of the alternate latching type for alternately latching and unlatching said second control member in response to successive movements thereof to its energizing position,
said latching element being movable alternately between latching and unlatching positions,
said disabling means of said interlock member being operative to prevent movement of said latching element to its latching position.

10. A switch according to claim 8,
said latching means being of the alternate latching type for alternately latching and unlatching said second control member in response to successive movements thereof to its energizing position,
said latching element including a ball,
said interlock member having a guide element for receiving and guiding said ball,
said ball being movable alternately along said guide element between latching and unlatching positions,
said disabling means of said interlock member including a portion of said interlock member at one end of said guide element for engaging said ball to prevent movement of said ball to its latching position.

11. A switch according to claim 10,
said interlock operating means including second biasing means for biasing said interlock member toward its enabling position,
said interlock operating means including a portion of said first control member engageable with said interlock member for moving said interlock member to its disabling position against the biasing action of said second biasing means when said first control member is moved to its OFF position.

12. A switch according to claim 8,
said interlock operating means including second biasing means for biasing said interlock member toward its enabling position,
said interlock operating means including a portion of said first control member for engaging and moving said interlock member to its disabling position against the biasing action of said second biasing means when said first control member is moved to its OFF position.

13. A switch according to claim 8,
said interlock operating means including second biasing means for biasing said interlock member toward its enabling position,
said interlock operating means including a portion of said first control member for engaging and moving said interlock member to its disabling position against the biasing action of said second biasing means when said first control member is moved to its OFF position,
said latching means being of the alternate latching type for alternately latching and unlatching said second control member in response to successive movements thereof to its energizing position,
said latching element being movable alternately between latching and unlatching positions, said disabling means of said interlock member being operative to prevent movement of said latching element to its latching position.

14. A switch according to claim 13, said interlock member having a guide element for guiding said latching element, said disabling means including a portion of said interlock member at one end of said guide element for engaging said latching element to prevent movement of said latching element to its latching position.

15. A plural function control switch, comprising
casing means,
a first control member movable in said casing means along a path between a first position and at least a second position,
means operable by said first control member for performing first and second control functions in said first and second positions,
means for moving said control member along said path,
a second control member movable in said casing means between third and fourth positions,
biasing means for biasing said second control member toward said third position,
means operable by said second control member for performing third and fourth control functions in said third and fourth positions,
latching means for latching said second control member in said fourth position,
said latching means including a latching element,
interlock means movable between enabling and disabling positions,
said interlock means having disabling means for disabling said latching element with said interlock means in said disabling position while enabling said latching element with said interlock means in said enabling position,
and interlock operating means operable by said first control member for moving said interlock means to said disabling position when said first control member is moved to said first position while moving said interlock means to said enabling position when said first control member is moved away from said first position,
said latching means thereby being disabled when said first control member is in its first position while being enabled to latch said second control member in its fourth position when said first control member is moved away from its first position to said second position.

16. A switch according to claim 15, said latching means being of the alternate latching type for alternately latching and unlatching said second control member in response to successive movements thereof to its fourth position, said latching element being movable alternately between latching and unlatching positions, said disabling means of said interlock means being operative to prevent movement of said latching element to its latching position.

17. A switch according to claim 15, said latching means being of the alternate latching type for alternately latching and unlatching said second control member in response to successive movements thereof to its fourth position, said latching element including a ball, said interlock means having a guide element for guiding said ball, said ball being movable alternately along said guide element between latching and unlatching positions, said disabling means of said interlock means including a portion of said interlock means for engaging said ball to prevent movement of said ball to its latching position.

18. A switch according to claim 17, said interlock operating means including second biasing means for biasing said interlock means toward its enabling position, said interlock operating means including a portion of said first control member engageable with said interlock means for moving said interlock means to its disabling position against the biasing action of said second biasing means when said first control member is moved to its first position.

19. A switch according to claim 15, said interlock operating means including second biasing means for biasing said interlock means toward said enabling position, said interlock operating means including a portion of said first control member for engaging and moving said interlock means to its disabling position against the biasing action of said second biasing means when said first control member is moved to its first position.

20. A switch according to claim 15, said interlock operating means including second biasing means for biasing said interlock means toward said enabling position, said interlock operating means including a portion of said first control member for moving said interlock means to said disabling position against the biasing action of said second biasing means when said first control member is moved to its first position, said latching means being of the alternate latching type for alternately latching and unlatching said second control member in response to successive movements thereof to its fourth position, said latching element being movable alternately between latching and unlatching positions, said disabling means of said interlock means being operative to prevent movement of said latching element to its latching position.

21. A switch according to claim 20, said interlock means having guide means for guiding said latching element, said disabling means including a portion of said interlock means at one end of said guide means for engaging said latching element to prevent movement of said latching element to its latching position.

* * * * *